US008594561B2

(12) United States Patent
Walke et al.

(10) Patent No.: US 8,594,561 B2
(45) Date of Patent: Nov. 26, 2013

(54) CELLULAR WIDE-AREA RADIO COMMUNICATIONS SYSTEM WITH RELAY-ENHANCED CELLS

(75) Inventors: Bernhard Walke, Würselen (DE); Norbert Esseling, Bonn (DE)

(73) Assignee: Deutsche Telekom AG, Bonn (DE)

( * ) Notice: Subject to any disclaimer, the term of this patent is extended or adjusted under 35 U.S.C. 154(b) by 245 days.

(21) Appl. No.: 13/136,230

(22) Filed: Jul. 26, 2011

(65) Prior Publication Data

US 2012/0003924 A1    Jan. 5, 2012

Related U.S. Application Data

(63) Continuation-in-part of application No. 11/788,246, filed on Apr. 19, 2007, now Pat. No. 8,229,351.

(30) Foreign Application Priority Data

Oct. 20, 2004 (EP) .................................. 04024930

(51) Int. Cl.
*H04B 7/14* (2006.01)
(52) U.S. Cl.
USPC ................................ 455/7; 455/10; 370/336

(58) Field of Classification Search
USPC ........ 370/334, 336, 400; 455/7, 10, 422, 507, 455/452.1, 442; 375/214; 709/233, 241
See application file for complete search history.

(56) References Cited

U.S. PATENT DOCUMENTS 7,184,703 B1 * 2/2007 Naden et al. .................... 455/10
2004/0233918 A1 * 11/2004 Larsson et al. ................ 370/400

* cited by examiner

*Primary Examiner* — Phuoc H Doan
(74) *Attorney, Agent, or Firm* — Klaus J. Bach

(57) ABSTRACT

In a cellular wide-area radio communications system, comprising a plurality of base stations; a plurality of relay stations; and a plurality of mobile stations; wherein each of the relay stations is associated with at least one of the base stations, each of the mobile stations is associated with at least one of the base stations or one of the relay stations, wireless data transmissions between mobile stations and base stations take place either as single-hop data transmissions between the mobile stations and their associated base stations, or as multi-hop data transmissions between the mobile stations and their associated relay stations and a data transmission between the relay stations and base stations associated with the relay stations, and wherein an average number of multi-hop data transmissions in the radio communications system equals at least an average number of single-hop data transmissions.

21 Claims, 11 Drawing Sheets

● AP ■ FMT ▽ Antenna

CELLULAR WIDE-AREA RADIO COMMUNICATIONS SYSTEM WITH RELAY-ENHANCED CELLS

This is a cip application of application Ser. No. 11/788,246 filed Apr. 19, 2007 now U.S. Pat. No. 8,229,351.

FIELD OF THE INVENTION

The invention relates to a cellular wide-area radio communications system and to a base station, relay station and mobile station in such a system.

BACKGROUND OF THE INVENTION

State-of-the-art cellular radio communications systems such as the Global System for Mobile Communications (GSM) and the Universal Mobile Telecommunications System (UMTS) provide radio coverage for a plurality of mobile stations by placing a plurality of base stations in a substantially regular arrangement across an area that is to be covered by said radio communications system. Each of said base station then defines a cell of said radio communications system and uses a set of transmission channels, which may for instance be defined by frequency carriers, spreading codes or time slots, to allow for data transmissions between said base station and said mobile stations that are located in said cell. To reduce interference between data transmissions of neighboring cells, orthogonal sets of transmission channels are used by base stations of adjacent cells, which is for instance achieved by defining that sets of transmission channels of neighboring cells use different frequency bands. The overall available frequency bandwidth then is split into frequency bands, the number of which is denoted as cluster size, and the frequency bands then are assigned to the base stations of the radio communications system so that a maximum distance between base stations using the same frequency bands is achieved.

However, the centered position of the base station in the middle of a substantially circular cell (which is approximated as hexagonal cell to allow for a seamless paving of the coverage area) leads to a decrease of the Carrier-to-Interference (C/I) power ratio towards the cell border, which is mainly due to the decrease of the power of an electromagnetic wave being proportional to the propagation distance raised to the power of a path loss exponent, which typically is larger than 2. As in all state-of-the-art transmission technologies, the end-to-end throughput between the base station and the mobile station is linked to the C/I, correspondingly the end-to-end throughput declines towards the cell border, which makes it difficult to guarantee a certain end-to-end-throughput for mobile stations that can be located anywhere in a cell or may even be moving through the cell.

Modern radio air interfaces have available various physical modes (PHY-modes), i.e. different combinations of modulation and coding schemes that are each applicable up to a minimum C/I signal value at a receiver in the cell. A high-valued PHY-mode is transmitting symbols with a high number of bits per symbol whilst a low-valued PHY-mode is just transmitting binary symbols. A mobile station close to the base station typically experiences a high C/I value and therefore can make use of a high-valued PHY-mode whilst a mobile station close to the cell border experiences typically a low C/I value and therefore preferably is assigned a low-valued PHY-mode. This situation is called the "unfairness in transmission rate assignment" to mobile stations, dependent on their location in the cell.

CDMA-based cellular systems allow to partly overcome this unfairness on cost of the whole capacity available in a cell: there the mobile stations close to the cell border could be served with a comparably higher transmission rate as mobile stations close to the base station by increasing the amount of power of the transmission channels of said mobile stations close to the border, at the cost of a reduction of the total cell capacity that can be provided to other users and a correspondingly substantially reduced spectral efficiency.

The fact that the area of a circle increases quadratically with its radius, leads to the situation that most mobile stations are located near the cell border, when it is assumed that the mobile stations are equally distributed over the cell area. Consequently, a substantial portion of the mobile stations in a cell suffer from a low end-to-end throughput (or cause reduction of the overall cell capacity in a CDMA system), directly affecting the spectral efficiency (in bit/s/Hz/m$^2$) that can be achieved with such a cellular radio communications system, and rendering the application of this cellular concept disadvantageous with respect to the requirements of future mobile radio communications systems.

Prior art document "Power Consumption reduction by multi-hop transmission in cellular networks" by Jee-Young Song et al., IEEE 60th Vehicular Technology Conference (VTC 2004-Fall), Sep. 26-29, 2004, Los Angeles, Calif., USA, pages 3120-3124, discloses relaying in cellular networks, wherein two-hop transmissions take place between a base station and a mobile station via a relay station. The relaying functionality is provided by mobile stations of the network, i.e. the relay stations are mobile stations. This prior art document concentrates on the issue of power consumption. It is assumed that each mobile station and base station has limited transmission power. Based on this assumption, closed-form solutions for the probability that a mobile station is in range of a (mobile) relay station (which in turn is in range of the base station) are derived. Furthermore, the transmission power of single-hop and two-hop transmission between base and mobile stations are derived and compared, yielding the result that, as the number of (mobile) relay stations increases, the probability that mobile stations find a (mobile) relay station and save power increases.

Prior art document "Capacity of a Relaying Infrastructure for Broadband Radio Coverage of Urban Areas" by Tim Irnich et. al, IEEE 58th Vehicular Technology Conference (VTC 2003-Fall), Oct. 6-9, 2003, Orlando, Fla., USA, vol. 5, pages 2886-2890, discoses the introduction of relaying into cellular broadband radio systems in urban areas to improve coverage. A methodology to quantify the influence of relaying on the capacity of a single base station is presented. Therein, a base station with four fixed relay stations covering the same area like five base stations in a conventional cellular architecture is considered.

SUMMARY OF THE INVENTION

In view of the above-stated problems, it is, inter alia, an object of the present invention to provide a cellular radio communications system with an increased spectral efficiency, and to provide components for such a system.

It is proposed a cellular wide-area radio communications system, comprising a plurality of base stations; a plurality of relay stations; and a plurality of mobile stations; wherein each of said relay stations is associated with at least one of said base stations, wherein each of said mobile stations is associated at least with one of said base stations or one of said relay stations, wherein wireless data transmissions between mobile stations and base stations take place either as single-hop data transmissions between said mobile stations and their associated base stations, or as multi-hop data transmissions that comprise a data transmission between said mobile stations and their associated relay stations and a data transmission between said relay stations and base stations associated with said relay stations, and wherein an average number of multi-hop data transmissions in said radio communications system is equal to or larger than an average number of single-hop data transmissions.

Said radio communications system allows for the wireless transmission of information, for instance data, speech and/or multimedia information such as audio or video, between base stations and base stations. Said radio communications system may further comprise a radio access network for the control of the base stations and a core network that allows connection to other networks, as for instance the internet, or communication systems such as public switched telephone networks or further radio communications systems.

Said radio communications system is a cellular system that comprises a plurality of cells, wherein each cell may for instance represent an area that is covered or controlled by a base station and possibly one or several relay stations that are associated with said base station.

Said radio communications system is furthermore a wide-area system that is deployed in propagation scenarios where substantially a medium to low average building height is typically encountered.

Said radio communications system comprises pluralities of base stations, relay stations and mobile stations, wherein certain associations exist between said stations. It is however not excluded that the radio communications system comprises further base stations and mobile stations that are characterized by further or different associations.

Said base stations are understood as access points to a core network of said radio communications system, wherein said base station are positioned across the coverage area of said radio communications system.

Said relay stations are understood as stations that can exchange data with both base stations and mobile stations in a wireless way and may be fixed or mobile. In each cell, a couple of relay stations may for instance be arranged around a base station that is positioned in the centre of said cell to form a relay-enhanced cell.

Said mobile stations are understood as stations that desire access to said core network of said radio communication system via said base stations either directly or additionally via said relay stations.

Each of said relay stations is associated with at least one of said base stations. This may for instance be the base station closest to said relay station, but can equally well be any other base station. Said association may be fixed or dynamically changing.

Each of said mobile stations is associated at least with one of said base stations or one of said relay stations. Therein, if said mobile is associated with a relay station, it may either be aware that it is not directly served by a base station, or may not be aware that it is served by a relay station instead of a base station. Said association of said mobile station may for instance be determined by the distance or pathloss from the mobile station to the base station and the relay station, or by a quality of a data transmission between the mobile station and the base station compared to the quality of a data transmission between the mobile station and the relay station (for instance in terms of C/I or error rate). Said mobile station may also be associated with more than one base station and/or relay station, for instance in a handover scenario, where a mobile station is moving from one relay-enhanced cell to the neighboring relay enhanced cell. Multiple associations may also exist in the case that macro diversity is implemented and the signals are transmitted and received by several base stations and/or several relay stations to achieve a diversity gain.

Wireless data transmissions between a mobile station and a base station, which are understood either as data transmissions from the mobile station to the base station or as data transmissions from the base station to the mobile station, can then take place in two ways: Either as a single-hop data transmission directly between said mobile station and its associated base station, or a multi-hop data transmission, for instance as two-hop data transmission that comprises two data transmissions, wherein the first data transmission takes place between said mobile station and its associated relay station, and the second data transmission takes place between said relay station and the base station associated with said relay station. In this way, data is transmitted between said mobile station and a base station.

Said data transmission can be circuit-switched or packet-switched and can be based on all types of transmission technologies and multiple access technologies.

According to the present invention, it is now proposed that an average number of multi-hop data transmissions in said radio communications system is equal to or larger than an average number of single-hop data transmissions, wherein said averaging of said number of data transmissions considers all data transmissions between mobile stations and base stations (which can either be single-hop or multi-hop data transmissions) occurring in said cellular wide-area radio communications system during a pre-defined time period.

This proposal of the present invention clearly differentiates the present invention from prior art cellular wide-area radio communications systems. In prior art systems, a relay station is only deployed to provide radio coverage in a spot of a cell where, due to shadowing, insufficient radio coverage for a small number of mobile stations occurs, and where radio coverage for substantially all mobile stations in a cell is provided by the base station in the centre of the cell.

In contrast, the present invention for the first time proposes to deploy relay stations to provide radio coverage for a large amount of mobile stations in a cell (and not only in a single spot suffering from shadowing), which proposal is reflected by the feature that the average number of multi-hop transmissions in the radio communications system is larger than the average number of single-hop transmissions. In each cell, the base station and a couple of relay stations then may for instance form a relay-enhanced cell, wherein the base station can use a significantly reduced transmission power, because only the relay stations and a small number of mobile stations in the coverage area of the base station need to be served, and wherein mobile stations that can no longer be reached by the base station are served by the relay stations.

Depending on the positioning of the relay stations, the distance between the mobile stations and their associated base station or relay station is significantly reduced as compared to prior art systems, so that the C/I and the end-to-end throughput of the data transmissions is vastly improved. For instance, if the relay stations in a relay-enhanced cell are symmetrically arranged around the base station, the steepness of the decline of the end-to-end throughput towards the cell border of the relay enhanced cell can be reduced, and an equalized end-to-end throughput per area element can be achieved in the relay enhanced cells. Correspondingly, then the end-to-end throughput experienced by a large number of mobile stations is significantly increased.

With respect to the spectral efficiency of the proposed system, it is noted that this increase of the end-to-end throughput of a large number of mobile stations is so pronounced that it even compensates for the necessity to transmit the same information twice or more within the multi-hop data transmission in a cell, so that the proposed radio communication system achieves a significantly increased spectral efficiency as compared to prior art wide-area cellular radio communication systems.

It should furthermore be noted that the deployment of relay stations in a wide-area radio communications system is by no means anticipated or rendered obvious by the state-of-the-art deployment of relay stations in radio communication systems that operate in densely built urban areas with large average building heights. In such prior art systems, the deployment of relay stations is the only way to provide coverage in shadowed regions.

In contrast, in a wide-area propagation scenario, for which the system of the present invention is proposed, there is actually no necessity to work with relay stations, because shadowed regions are scarce, and because it was assumed so far that the introduction of relay stations without reason only would cause additional overhead due to the at least duplicate transmission of the same data in the multi-hop data transmissions. However, as recognized by the present invention and explained above, the fact that the end-to-end throughput of the radio communication system with relay stations is vastly increased in particular at the cell border, where a large amount of mobile stations is located, by far outweighs the overhead of the multi-hop transmissions and causes the newly proposed radio communication system to be more spectrally efficient than its state-of-the-art predecessors.

According to an embodiment of the present invention, in said data transmissions between said relay stations and their associated base stations, directional receive antennas are used by said relay stations and/or said base stations.

Said receive antennas may have an antenna pattern that is fixed, or may have a dynamically controllable antenna pattern as it is for instance the case with a multi-element antenna that is controlled in hardware or software. As said data transmission between said relay stations and their associated base stations carry the data of several data transmissions between the relay stations and their associated mobile stations, a high quality and throughput of the data transmission between the relay stations and their associated base stations is advantageous. This desirable feature can be achieved by using said directional receive antennas, which direct the peak of the antenna pattern towards the respective transmitter to reduce the amount of received interference and thus increase the C/I. The use of directional receive antennas is particularly easy in case of fixed relay stations, because the directional receive antennas at the base station and relay station then need to be adjusted to the respective associated other stations only once when installing the relay stations. However, if the relay stations are mobile as well, or if relays would be able to decide situation-dependant to which base station to assign themselves, directional receive antennas with dynamically controllable antenna patterns may be used to adaptively steer the peak of the antenna pattern towards the respective transmitting station. Said directional antennas may also be used as directional transmit antennas for the data transmissions between said relay stations and their associated base stations.

According to a further embodiment of the present invention, each of said base stations is associated with at least two relay stations, and each of said base stations with its at least two associated relay stations provides radio coverage for mobile stations in one respective relay-enhanced cell of said cellular radio communications system.

Said cellular radio communications system then comprises a plurality of relay-enhanced cells, wherein each relay-enhanced cell comprises a base station and at least two associated relay stations. The shape of said cell is determined by the positioning of the base station and the at least two relay stations. In a relay-enhanced cell, the base station and the relay stations may share a set of transmission channels or may use orthogonal sets of transmission channels.

According to a further embodiment of the present invention, in each relay-enhanced cell, said relay stations and said base station they are associated with are substantially symmetrically positioned.

Therein, when planning said cellular radio communications system, a basic positioning may prescribe a symmetrically arrangement of said base station and associated relay stations, and wherein due to topographic and/or geographic conditions, a slight deviation from said basic positioning may be required. In case of two relay stations per relay-enhanced cells, said relay stations may for instance be arranged on a circle around the base station, or said base station and said relay stations may form the edge points of a triangle. In case of three relay stations, said three relay stations may for instance be equally distributed on a circle around the base station, and similar arrangements may be used in case of four or more relay stations per relay-enhanced cells. It may also be advantageous to use two circles of relay stations around the base station, in particular, but not limited thereto, in systems where more than two hops are used for data transmission between a mobile station and a base station.

Alternatively, said relay stations and base station in each relay-enhanced cell may also be asymmetrically arranged in order to better match the propagation conditions in each relay-enhanced cells.

According to a further embodiment of the present invention, said relay-enhanced cells are positioned across the coverage area of said cellular radio communications system according to a substantially regular arrangement.

In said substantially regular arrangement, said base stations of said relay-enhanced cells may for instance have substantially equal distance from each other, wherein topographical and/or geographical conditions may afford a deviation from an arrangement pattern that exactly fulfils said distance criterion or any other criterion.

According to a further embodiment of the present invention, in each relay-enhanced cell, a position of said relay stations and said base station they are associated with is determined so that an equalization of a carrier-to-interference power ratio per small area element of the cellular radio communications system is achieved, wherein said small area element is some orders of magnitude smaller than the total area covered by said relay-enhanced cell.

Therein, said carrier-to-interference power ratio may for instance refer to the average carrier-to-interference power ratio experienced by the data transmissions between the mobile stations and their associated relay stations and the mobile stations and their associated base stations. Said equalization of values may for instance be understood as a removal of large differences between said values.

According to a further embodiment of the present invention, in each relay-enhanced cell, a position of said relay stations and said base station they are associated with is determined so that an equalization of an available end-to-end transmission capacity per small area element of the cellular radio communications system is achieved, wherein said small area element is some orders of magnitude smaller than the total area covered by said relay-enhanced cell.

Herein, said end-to-end throughput refers to the average end-to-end throughput of data transmissions between mobile stations and base stations, which can either be single-hop or multi-hop data transmissions. Said equalization of values may for instance be understood as a removal of large differences between said values with respect to the coverage area of the radio communications system.

According to a further embodiment of the present invention, each base station in a relay-enhanced cell is associated with K≥2 relay stations, and wherein said K relay stations are substantially positioned on a circle around said base station they are associated with mutual angular distances of substantially 360°/K.

For instance, if K=3 relay stations are used, this positioning may allow for an advantageous trade-off between costs required for the installation of said relay stations and increase in the spectral efficiency of the system. The radius of said circle may be varied, for instance to influence the distribution of the average C/I or end-to-end throughput in the relay-enhanced cell.

According to a further embodiment of the present invention, each base station and each relay station use respective transmission channels for their data transmissions, wherein said transmission channels are defined by a carrier frequency and/or time slot and/or spreading code and/or polarization state and/or spatial direction and/or group of frequency subcarriers.

Said transmission channels may for instance reflect the type of multiple access technique that is used by the base station and relay station, respectively. For instance, in a Time Division Multiple Access (TDMA) technique, said transmission channels may represented by time slots, in a Frequency Division Multiple Access (FDMA) technique, said transmission channels may be represented by frequency carriers, in a Code Division Multiple Access (CDMA) technique, said transmission channels may be represented by spreading codes, in a Space Division Multiple Access (SDMA) technique, said transmission channels may be represented by antenna beams or sectors, in a Polarization Division Multiple Access (PDMA) system, said transmission channels may be represented by polarization states, and in an Orthogonal Frequency Division Multiple Access (OFDMA) technique, said transmission channels may be represented by groups of frequency sub-carriers. If combined multiple access techniques, as for instance combinations of TDMA and FDMA or TDMA and CDMA, are used, the transmission channels are represented by a time slot and frequency carrier or a time slot and a spreading code, respectively.

Said transmission channels may nevertheless depend on further parameters as for instance a frequency band or a scrambling code that can be used by the multiple access techniques. Transmission channels that use the same frequency band and/or scrambling code may then be understood to stem from the same set of transmission channels. Said scrambling code does generally not cause a spreading of the data symbols it is multiplied with, in contrast to the spreading code.

According to a further embodiment of the present invention, in each relay-enhanced cell, said base station and its associated relay stations share transmission channels from one set of transmission channels.

The transmission channels in one set of transmission channels may for instance be characterized by the use of the same frequency band and/or scrambling code. For each relay-enhanced cell, then a set of transmission channels exists, wherein said set of transmission channels can for instance be the same for all relay-enhanced cells. In a TDMA-based system, said set of transmission channels may for instance comprise a plurality of time slots, and in an FDMA (or OFDMA) system, it may comprise a plurality of frequency carriers (or groups of frequency subcarriers). In adjacent relay-enhanced cells, different sets of transmission channels may be used, which, in case of an FDMA system, may for instance be achieved by using a plurality of frequency carriers from a first frequency band in one relay-enhanced cell and a plurality of frequency carriers from a second frequency band for a second relay-enhanced cells. The same set of transmission channels then may be re-used by relay-enhanced cells that have a larger distance. Sharing of transmission channels in each relay-enhanced cell may for instance be controlled by the base station of said relay-enhanced cell.

According to a further embodiment of the present invention, all transmission channels of one set of transmission channels use the same frequency band.

According to a further embodiment of the present invention, N sets of transmission channels are available for said relay-enhanced cells, and wherein for N>1, said N sets of transmission channels are substantially orthogonal. Therein, orthogonality of sets of transmission channels is given when each transmission channel of a first set of transmission channels is orthogonal to each transmission channel from a second set of transmission channels. Said N sets of transmission channels may for instance use N different frequency bands, respectively. If N=1 holds, all base and relay stations in a relay-enhanced cells use the same set of transmission channels, and interference is caused between data transmissions of base and relay stations of different relay-enhanced cells. The distance between relay-enhanced cells the base and relay stations of which use the same set of transmission channels can be increased by assigning more than N=1 sets of transmission channels to said relay-enhanced cells.

According to a further embodiment of the present invention, sets of transmission channels are assigned to say relay-enhanced cells so that a distance between relay-enhanced cells using the same set of transmission channels is optimized according to a pre-defined optimization criterion.

For a given number N, and depending on the applied optimization criterion, this approach may guarantee a minimum amount of interference between data transmissions in said relay-enhanced cells. Said optimization criterion may for instance target at reaching some minimum or average C/I value or quality of service characteristic throughout the cellular system. According to a further embodiment of the present invention, N>1 holds, and said N sets of transmission channels are assigned to said relay-enhanced cells so that relay-enhanced cells that use the same set of transmission channels are positioned across the coverage area of said cellular radio communications system in a substantially regular arrangement.

Then said relay-enhanced cells may for instance form a frequency re-use cluster with cluster size N as in the prior art cellular systems with their hexagonal cells. The sets of transmission channels are assigned to the relay-enhanced cells so that, for a given paving of an area with relay-enhanced cells and fixed size of the relay-enhanced cells, the distance between relay-enhanced cells that use the same set of transmission channels is maximized. All relay-enhanced cells that use the same set of transmission channels then form a substantially regular arrangement which is particularly easy to plan.

According to a further embodiment of the present invention, each of said base stations and each of said relay stations is assigned a respective set of transmission channels for their respective data transmissions.

Said base stations and relay stations in each relay-enhanced cell then do not necessarily share transmission channels, but use transmission channels from the sets of transmission channels that have been assigned to them. If said sets of transmission channels used by a base station and its associated relay stations in a relay-enhanced cell are orthogonal, which is for instance the case if said sets of transmission channels use different frequency bands and/or scrambling codes, then data transmissions between the base station and its associated mobile stations and data transmissions between the relay stations and their associated mobile stations can take place in the relay-enhanced cell without causing mutual interference and without requiring scheduling of jointly used transmission channels.

According to a further embodiment of the present invention, all transmission channels of one set of transmission channels use the same frequency band.

According to a further embodiment of the present invention, N different sets of transmission channels can be assigned to said relay stations, and for N>1, said N sets of transmission channels are substantially orthogonal.

Said N sets of transmission channels may for instance use N different frequency bands, respectively. If N=1 holds, all relay stations use the same set of transmission channels, and interference is caused between data transmissions of different relay stations. The distance between relay stations that use the same set of transmission channels can be increased by assigning more than N=1 sets of transmission channels to said group of relay stations.

According to a further embodiment of the present invention, M different sets of transmission channels can be assigned to said base stations, and for M>1, said M sets of transmission channels are substantially orthogonal.

Said M sets of transmission channels may for instance use M different frequency bands, respectively. If M=1 holds, all base stations use the same set of transmission channels, and their data transmissions cause interference to data transmissions of other base stations. The distance between base stations that use the same set of transmission channels can be increased by assigning more than M=1 sets of transmission channels to said base stations.

According to a further embodiment of the present invention, sets of transmission channels used by a base station and its associated relay stations in a relay-enhanced cell are substantially orthogonal.

For instance, sets of transmission channels used by the base and relay stations may use different frequency bands, and then be exactly orthogonal, or may use different scrambling codes, and then are generally considered to be substantially orthogonal. In a relay-enhanced cell, then the base and relay stations associated with the base station use substantially orthogonal sets of transmission channels and thus do not cause mutual interference. This holds in all relay-enhanced cells. However, interference between relay-enhanced cells then still may occur.

According to a further embodiment of the present invention, sets of transmission channels used by at least two relay stations of a relay enhanced cell are substantially orthogonal. Orthogonality between said sets of transmission channels of relay stations of the same relay-enhanced cell may decrease the interference between the data transmissions of said relay stations.

According to a further embodiment of the present invention, at least two relay stations of a relay-enhanced cell use the same set of transmission channels.

Then the same set of transmission channels is reused in one relay-enhanced cell, which is particularly advantageous if the data transmissions of said relay stations only cause low interference due to the distant positioning of the relay stations or high propagation loss.

According to a further embodiment of the present invention, sets of transmission channels are assigned to said base stations and relay stations so that a distance between relay stations using the same set of transmission channels, between base stations using the same set of transmission channels and between base stations and relay stations using the same set of transmission channels is optimized according to a pre-defined optimization criterion.

Said optimization criterion may for instance target at reaching some minimum or average C/I value or quality of service characteristic throughout the cellular system. This may for instance be achieved by demanding that the relay stations in each relay-enhanced cell use substantially orthogonal sets of transmission channels, and that said sets of transmission channels used by said relay stations of each relay-enhanced cell are substantially orthogonal to the set of transmission channels used by the base station in said relay-enhanced cell. Then in each relay-enhanced cell, interference between the base station and the relay stations and interference among the relay stations is avoided or at least mitigated, and interference is then only caused among relay stations and base stations of neighboring relay-enhanced cells. By properly assigning the sets of transmission channels across the base and relay stations of all relay-enhanced cells of the cellular system, it can then be achieved that an average or minimum C/I or quality of service characteristic is not fallen below. Otherwise, the number of sets of transmission channels may have to be increased so that mutually interfering relay-enhanced cells can be better torn apart to match said criterion.

According to a further embodiment of the present invention, N different sets of transmission channels can be assigned to said relay and base stations, wherein for N>1, said N sets of transmission channels are substantially orthogonal.

Said relay stations and base stations then share sets of transmission channels from said N different sets of transmission channels.

According to a further embodiment of the present invention, said N sets of transmission channels are assigned to said relay and base stations of said cellular radio communications system to that relay stations that use the same set of transmission channels and base stations that use the same set of transmission channels are positioned across the coverage area of said cellular radio communications system in a substantially regular arrangement, respectively.

Then respective sub-cells formed by said relay stations and base stations of said entire cellular radio communications system may for instance form a frequency re-use cluster with cluster size N as in the prior art cellular systems with their hexagonal cells. The shape of said sub-cells may however no longer be hexagonal. The sets of transmission channels are assigned to the sub-cells so that, for a given paving of an area with sub-cells and fixed size of the sub-cells, the distance between sub-cells that use the same set of transmission channels is optimized according to a pre-defined optimization criterion, for instance to reach a minimum or average C/I value or a pre-defined quality of service characteristic. All sub-cells that use the same set of transmission channels then form a substantially regular arrangement which is particularly easy to plan.

For instance, if a relay-enhanced cell comprises three relay stations positioned on a circle around the base station with 120° angular spacing, said sub-cells formed by said relay stations and said base station may be hexagonal sub-cells that seamlessly pave the coverage area of the cellular radio communication system, and then a cluster size N=3 can be used, so that in each relay-enhanced cell, automatically each relay station and each base station uses a different set of transmission channels as its neighboring relay stations in the relay-enhanced cell and its neighboring relay stations that belong to neighbored relay-enhanced cells.

According to a further embodiment of the present invention, data transmissions between a base station and its associated mobile stations and data transmissions between said base station and its associated relay stations share transmission channels from one set of transmission channels.

From a base station perspective, said relay stations then are considered as mobile stations. Alternatively, data transmissions between said base station and its associated relay stations may also be based on a transmission technique that differs from the transmission technique that is used for the data transmission between the base station and its associated mobile stations.

According to a further embodiment of the present invention, data transmissions of neighboring relay stations of different relay-enhanced cells are decoupled in the time domain and/or frequency domain and/or code domain and/or polarization domain and/or space domain.

This may be particularly advantageous if relay stations of neighboring relay-enhanced cells use the same set of transmission channels and thus may cause mutual interference. Transmission channels for data transmissions of said relay stations, in particular transmission channels for data transmissions directed towards their associated mobile stations, then are scheduled with respect to one or several of said domains, for instance by a central scheduling instance, and interference between the vital data transmissions of relays of neighboring relay-enhanced cells can be completely avoided. For instance, data transmissions of relay stations of neighboring relay-enhanced cells may be scheduled into different time instances to avoid interference.

According to a further embodiment of the present invention, it is ensured that transmission channels for data transmissions between base stations and their associated relay stations in a relay-enhanced cell are substantially orthogonal to transmission channels of data transmissions between base stations and their associated relay stations in neighboring relay-enhanced cells.

This may be particularly advantageous if all base stations use the same set of transmission channels and thus cause mutual interference. Substantial orthogonality between said data transmissions can for instance be achieved by taking care that, although the same set of transmission channels is used by two base stations, different transmission channels of said set of transmission channels are assigned for the data transmission between said base stations and their associated relay stations. According to a further embodiment of the present invention, said data transmissions are based on multi-carrier modulation. Said data transmission may for instance be based on Orthogonal Frequency Division Multiplex (OFDM) or its coded variant (COFDM).

According to a further embodiment of the present invention, said relay stations are layer-2 relays. Said relays then may for instance be capable of translating layer-2 protocols of the International Standardization Organization (ISO) Open Systems Interconnection (OSI) reference model, wherein said layer-2 protocols are used in different hops of said multi-hop data transmissions. If equal protocols are used for the hops of said multi-hop data transmissions, said layer-2 relay may provide other layer-2 related functionality, namely the layer-2 relay functions. Said layer-2 relay may then be considered as a "bridge".

According to a further embodiment of the present invention, said relay stations are layer-3 relays. Said relays then may for instance be capable of translating layer-3 protocols of the ISO OSI reference model, wherein said layer-3 protocols are used in different hops of said multi-hop data transmissions. If equal protocols are used for the hops of said multi-hop data transmissions, said layer-3 relay may provide other layer-3 related functionality, namely the layer-3 relay functions.

According to a further embodiment of the present invention, said base stations and/or said relay stations use multi-element or sector antennas at least for said data transmissions with their associated mobile stations.

For instance, if sector antennas are used, substantially orthogonal sets of transmission channels may be used by said base stations or relay stations in the sectors that are formed by said sector antennas. If multi-element antennas are used, beam-forming techniques, as for instance Spatial Filtering for Interference Reduction (SFIR) or Space Division Multiple Access (SDMA) may be applied to further reduce interference in the transmission and reception case or to increase the number of data transmission said base or relay station can support.

According to a further embodiment of the present invention, said base stations and said relay stations use multi-element antennas, and the capacity of said data transmissions between said base stations and their associated relay stations is increased by applying Multiple-Input Multiple-Output techniques.

Said Multiple-Input Multiple-Output techniques are based on the availability of at least two transmit antenna elements and at least two receive antenna elements any allow for the transmission of a number of data streams that equals the minimum of the number of transmit and receive antenna elements. Said data streams are transferred in an orthogonal fashion. As, depending on the number of antenna elements at transmitter and/or receiver, the C/I required for the successful transfer of said data streams may be quite high, it may also be advantageous to decouple said data transmission between said base station and their associated relay stations from other data transmissions, for instance in the time or frequency domain.

According to a further embodiment of the present invention, in each relay-enhanced cell, a broadcast channel is transmitted by said base station and its associated relay stations.

Said broadcast channel provides vital control information for the mobile stations in the relay-enhanced cell, so that is has to be assured that all mobile stations in the relay enhanced cell are able to receive said broadcast channel. In prior art, this is accomplished by transmitting the broadcast channel from the base station in the centre of the cell with maximum power level. In particular in CDMA-based systems, transmission of the broadcast channel with maximum power level concurrently to data transmission between the base station and the mobiles station reduces the capacity left for said data transmissions between base station and mobile station. When transmitting the broadcast channel from both the base station and the relay stations, as proposed by this embodiment of the present invention, the transmit power level can be vastly reduced, as the average distance between mobile stations and the next base or relay station is significantly smaller as in prior art. Consequently, less capacity is blocked by the transmission of the broadcast channel. In addition, it should be noted that the broadcast channel transmitted by the base station is received by its associated relay stations so that they can update the information at any time that the base stations broadcast, just by following the base station broadcast information.

Furthermore, as in prior art, the power level required for the transmission of the broadcast channel substantially determines the Class of the power amplifier that is required at the base station, it is also possible according to the present invention to use a power amplifier of a smaller class and thus to reduce costs.

It is further proposed a base station in a system according to the present invention.

It is further proposed a relay station in a system according to the present invention.

It is further proposed a mobile station in a system according to the present invention.

These and other aspects of the invention will become more readily apparent from the following description of embodiments thereof with reference to the accompanying drawings.

BRIEF DESCRIPTION OF THE DRAWINGS

It is shown in.

DETAILED DESCRIPTION OF THE INVENTION

The present invention proposes to deploy relay stations in a wide-area cellular radio communications system to achieve a more homogenous distribution of the C/I or end-to-end throughput over the coverage area and thus to increase the spectral efficiency of such a system.

In the sequel, a HIPERLAN2 (H2) system with relay stations will be described as an exemplary embodiment of the present invention. Therein, the base station in each cell will be denoted as Access Point (AP), the mobile stations will be denoted as Mobile Terminals (MTs), and the relay stations will be assumed fixed and denoted as Fixed Relay Stations (FRS). It should however be noted that the present invention can equally well be used with different kinds of radio communications systems, in particular radio communication systems that are based on Code Division Multiple Access (CDMA) and systems based on Frequency/Time Division Multiple Access (FDMA/TDMA). The HIPERLAN2 (H2) system is described here to explain how MAC frame based protocols as IEEE 802.11e, IEEE 802.16a (HIPER-MAN) and the recently adopted IEEE 802.15.3 can be applied to realize relaying in the time domain. All the MAC and PHY functions addressed here are existent in all these wireless standards and no changes of the existent specifications may be needed for relaying. However, either the Logical Link Control (LLC) or MAC layer now may need a store-and-forward function like that known from a bridge to connect LANs to each other. In the description of a H2 relay, we also use the term forwarding when referring to relaying.

Figure 1:
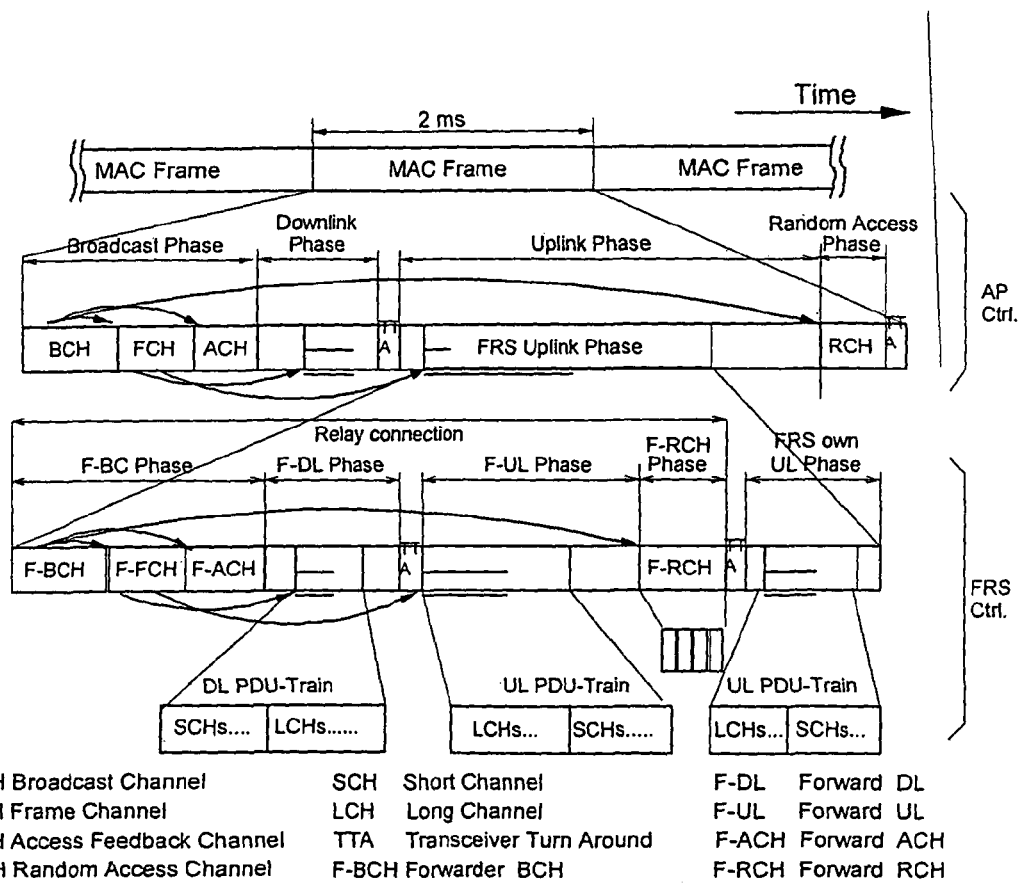
FIG. 1: a HIPERLAN2 Medium Access Control (MAC) frame with standard-conformant enhancements allowing for deployment of Fixed Relay Stations (FRSs) according to an embodiment of the present invention.

H2 specifies a periodic MAC frame structure, as depicted in FIG. 1. As can be readily seen, Time Division Multiple Access (TDMA) is used as multiple access technique, and Time Division Duplex (TDD) is applied to separate the uplink (UL) and downlink (DL) data transmissions.

Transmission channels that can be used by the APs and FRSs for their data transmissions then are represented by time slots in the UL and DL sections of a MAC frame, and for each transmission direction (UL, DL); a set of transmission channels is represented by a plurality of UL or DL time slots. As will be explained below, the AP and its associated FRSs share the UL and DL time slots.

As will be explained with reference to FIGS. 4 and 5a-5c, the UL and DL time slots used for multiple access in one cell of the cellular system use the same frequency band, and, by increasing the cluster size N, it is possible to assign different frequency bands to different cells of the cellular system to reduce the interference between data transmission of neighboring cells.

In the Forwarding Mode (FM), both signaling and user data are being forwarded by the FRS. An FRS operating in FM appears like a directly served MT to the AP. Therefore, this does not preclude the possibility of allowing any MT to act as relay to become a Mobile Relay Station (MRS). MTs are referred to as Remote MTs ((R)MTs) if they are served by (i.e. associated with) an FRS.

The capacity of the MAC frame (see FIG. 1, upper part) is assigned dynamically in a two-stage process:

First, transmit capacity for terminals directly associated with the AP of a relay-enhanced cell, i.e. the FRSs and the MTs, are allocated by the AP. An FRS appears to the AP like a MT but sets up a Sub Frame (SF) structure, which is embedded into the H2 MAC frame structure of the serving AP (refer to FIG. 1, bottom). The SF structure has available only the capacity assigned by the AP to the FRS.

Figure 2:
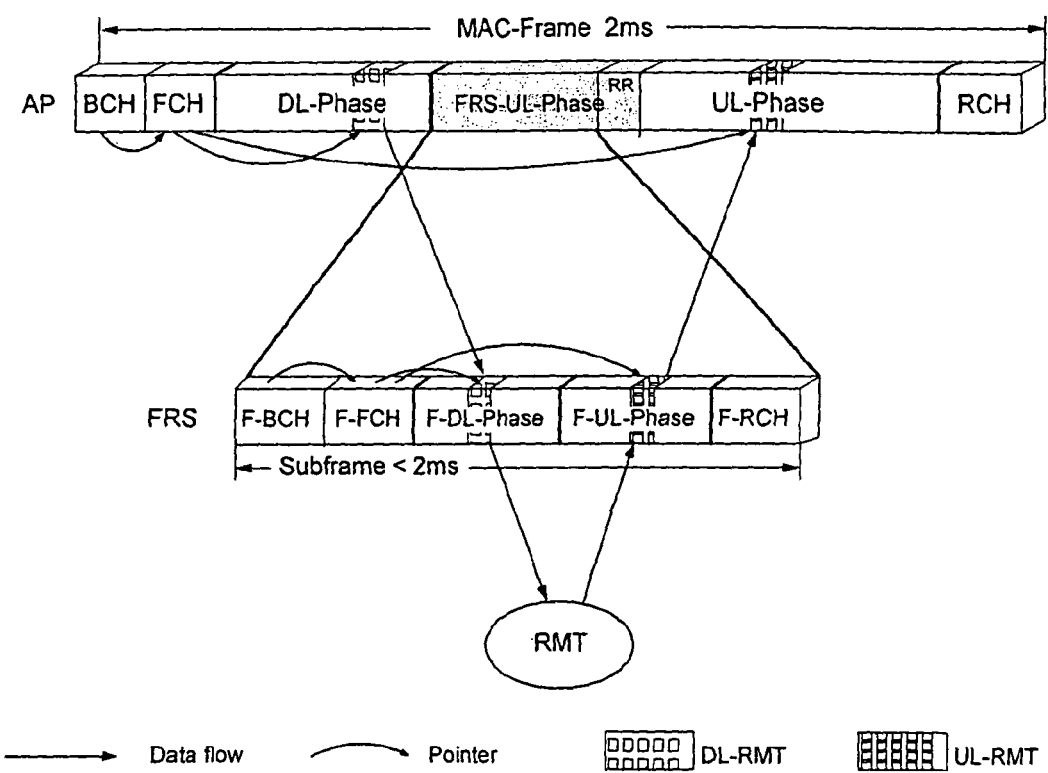
FIG. 2: a data flow from an Access Point (AP) to a Remote Mobile Terminal (RMT) in 2-hop mode according to an embodiment of the present invention.

This capacity is then dynamically allocated by the FRS to its RMTs according to the rules of the H2 MAC protocol. Using this scheme, the FRS needs one transceiver only. The SF is generated and controlled by the FRS (shown in FIG. 2) and it is structured the same as the MAC frame used at the AP. It enables communication with legacy H2 terminals without any modifications. It implements the same physical channels as the standard H2 (F-BCH, F-FCH, F-ACH, F-DL, F-UL and F-RCH), which carry now the prefix "F-" to indicate that they are set up by the FRS. A RMT may also set up a SF to recursively apply this relaying concept in order to cascade multiple relays.

FIG. 1 shows the functions introduced to the H2 MAC frame to enable relaying in the time domain. The capacity assigned in the MAC frame to the FRS to be used there to establish a SF is placed in the UL frame part of the AP. When the FRS is transmitting downlink, the data is addressed properly to its RMT and the AP will discard this data accordingly. The same applies for data transmitted from the RMT to the FRS. The capacity to exchange the data between AP and FRS has to be reserved as usual in both UL and DL directions on request by the FRS. A very similar operation is possible by using the Hybrid Coordinator Access in IEEE 802.11e.

The question arises under what circumstances relaying would be beneficial, i.e. when a 2-hop (multi-hop) data transmission is preferential to a one-hop (single-hop) transmission.

Figure 3:
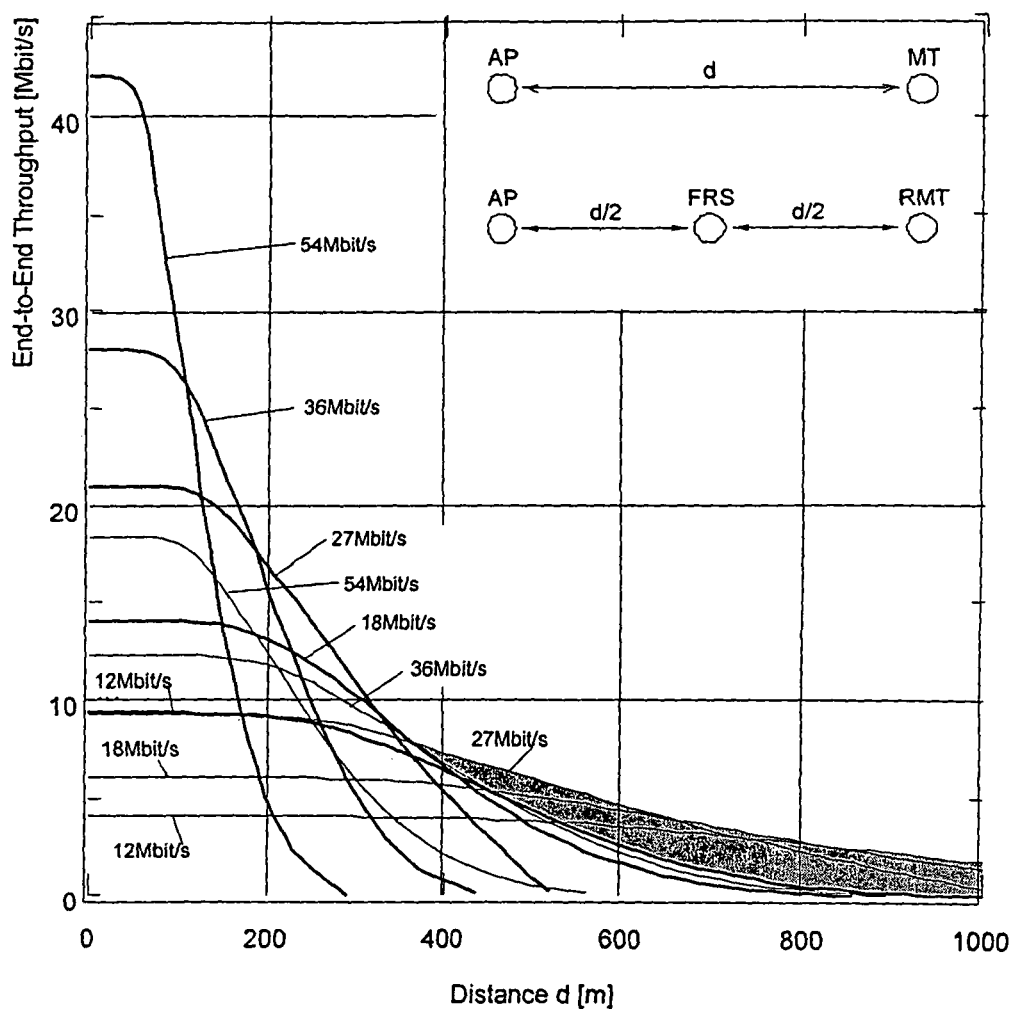
FIG. 3: a comparison of the maximum achievable end-to-end throughput as a function of the distance between an AP and a (R)MT for a 1-hop and 2-hop data transmission with an Selective Automatic Repeat Request (S-ARQ) link protocol according to an embodiment of the present invention and with a variety of PHY modes, resulting in transmission rates of 54, 36, 27, 18, 12 Mbit/s.

FIG. 3 presents analytical results comparing the throughput achieved with 1-hop and 2-hop data transmissions for the two scenarios depicted in the upper right corner of FIG. 3 when assuming Line of Sight (LOS) radio propagation.

In FIG. 3, it is assumed that the FRS is placed at half the distance between the AP and the (R)MT. It turns out from a distance of 370 m onwards, the 2-hop communication delivers a somewhat higher throughput than 1-hop, as marked by the shaded area. The example particularly illustrates that relaying increases the throughput close to the cell border of an AP (under LOS conditions), which is of particular relevance for the present invention.

Relaying is the consuming part of the capacity of an AP, since the relayed data has to go twice over the radio channel. However, it can be shown that for relay-based deployment concepts in wide-area scenarios with medium to low average building heights MTs served at different relays that belong to the same AP can be served at the same time, whereby the capacity loss introduced by the 2-hop data transmissions can be compensated to a great extent. The capacity loss can even be turned into a substantial gain, if directive antennas are used at FRS as will be described below.

Even if there is still a capacity loss resulting from a relay-based system, the relay-based concept according to the present invention is able to trade the capacity available at an AP against range of radio coverage.

The trend towards increasing transmission rates resulting from further developed radio modems tends to provide an over-capacity in the cell area served by an AP, especially in the first months/years after deploying a system. This over-capacity, in most cases, can not be extended by the base station to a sufficiently large area to reach a balance between capacity provided and capacity requested from the mobile stations in the cell, since there are power limitations to base station specified by regulator authorities. Relays substantially increase the size of the service area thereby increasing the probability that the capacity of an AP will be used effectively.

The low coverage range that cellular radio communication systems exhibit at high bit-rates was already shown in FIG. 3. In a prior art 1-hop cellular approach with hexagonal cells, this leads to a large number of APs required for continuous coverage. As proposed by the present invention, the use of FRSs can help to increase broadband radio coverage and thus also increase the spectral efficiency of the cellular radio communication system.

Figure 4:
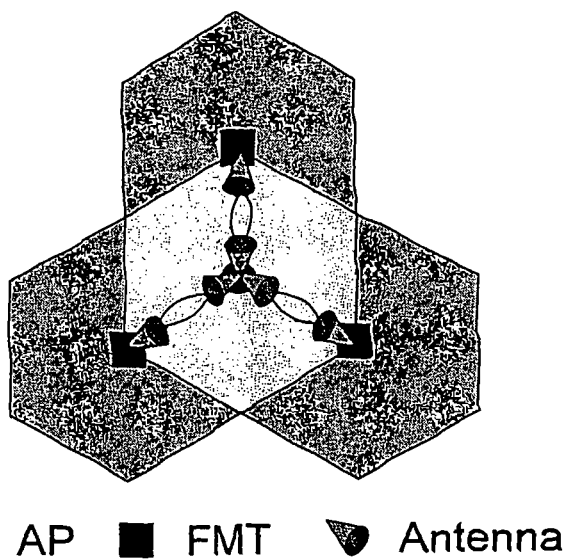
FIG. 4: a relay-enhanced cell with three relays in a wide-area propagation scenario according to an embodiment of the present invention.

FIG. 4 shows the basic element (referred to as relay-enhanced cell) used to achieve improved coverage and increased spectral efficiency in a cellular radio communications system according to the present invention.

It consists of an AP and 3 surrounding associated FRSs which can be embedded into a hexagonal cell structure. We consider a coverage radius for a single AP or FRS of R=200 m. The result is that a relay-enhanced cell, which consists of 4 sub-cells, covers the same area as a single-hop cell with a radius of R=346 m.

Figure 5A:
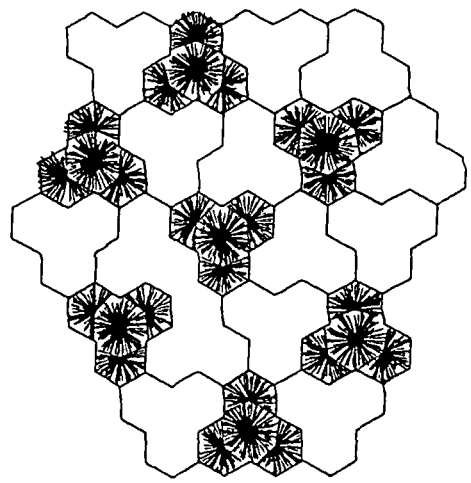
FIG. 5*a*: a paving of an area with relay-enhanced cells as shown in FIG. 4 for cluster size N=3 according to an embodiment of the present invention.
Figure 5B:
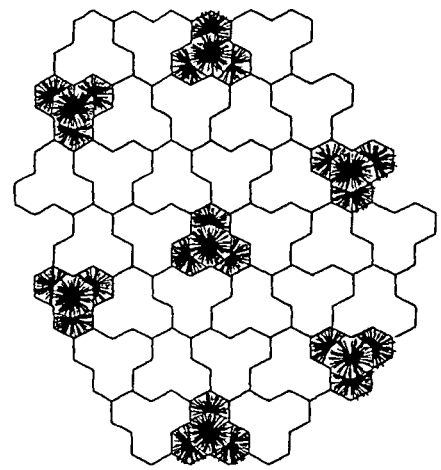
FIG. 5*b*: a paving of an area with relay-enhanced cells as shown in FIG. 4 for cluster size N=7 according to an embodiment of the present invention.
Figure 5C:
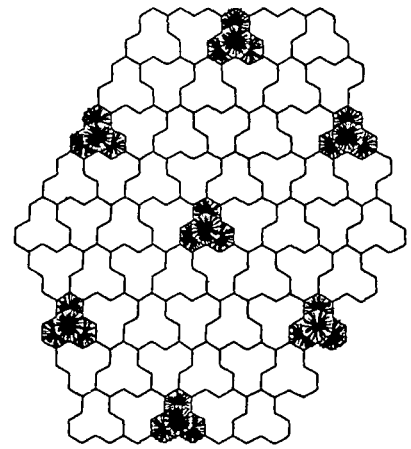
FIG. 5*c*: a paving of an area with relay-enhanced cells as shown in FIG. 4 for cluster size N=12 according to an embodiment of the present invention.

According to FIGS. 5a-5c, different cluster sizes N=3, 7, and 12 can be realized, respectively, just like in a prior art hexagonal cellular approach.

In the sequel of this detailed description of the invention, simulation results on the C/I and end-to-end throughput as a function of the distance from the AP, and the spectral efficiency that can be achieved with the relay-based concept according to the present invention will be presented.

All of the MAC-frame-based air interfaces mentioned above will most likely operate in the 5 GHz license-exempt bands (300 MHz in the US, 550 MHz in Europe, and 100 MHz in Japan) or in the 3.5 GHz band or other licensed bands. It is assumed in the following that the physical layer (PHY) uses an OFDM-based transmission with 20 MHz carrier bandwidth subdivided into orthogonal sub-carriers. The modem is assumed conformant to the IEEE 802.11a standard. These frequency bands are characterized by high attenuation and very low diffraction, leading to low radio range.

Figure 6:
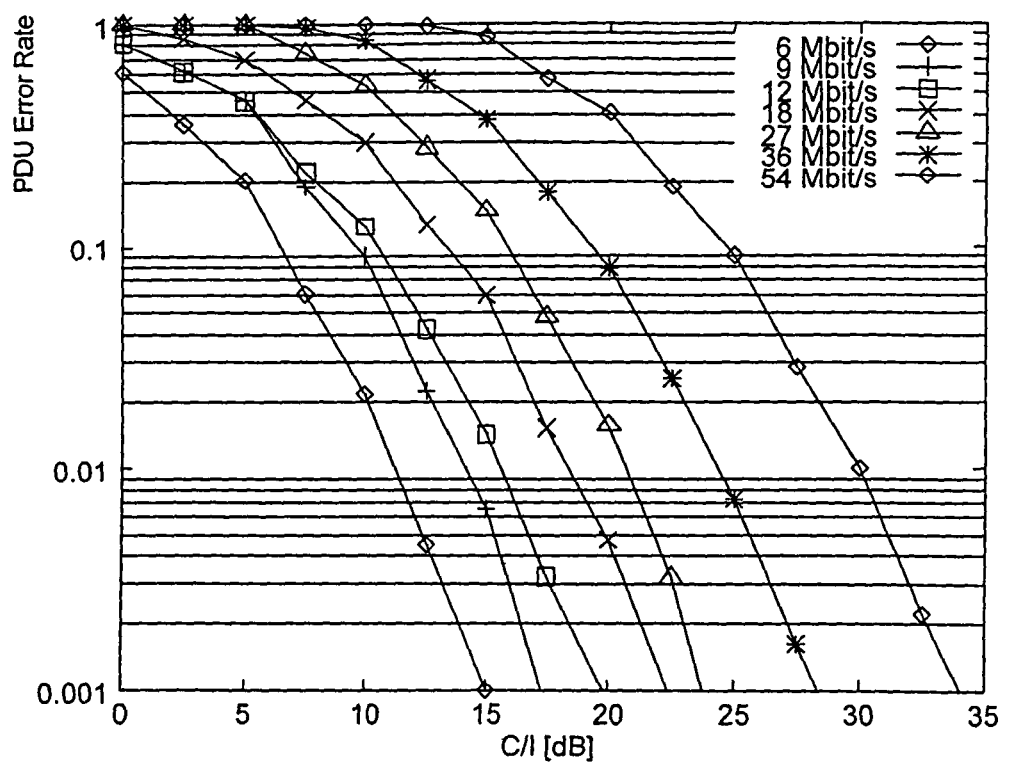
FIG. 6: a diagram depicting the Protocol Data Unit (PDU) error probability as a function of the C/(I+N) and parameterized with different physical modes (PHY-mode) of a modem according to the IEEE 802.11a standard.

In the simulations, the basis for the determination of transmission errors is the ratio of Carrier-to-Interference and Noise power (C/(I+N)). The results of link-level investigations provide a Protocol Data Unit (PDU) error-probability related to the average C/(I+N) during reception of the PHY-PDU. This relation is shown in FIG. 6.

In the applied simulation model, collisions of interfering transmissions are detected and the resulting average C/(I+N) is calculated for each transmitted PHY-PDU to decide on success or retransmission. The propagation model used in the wide-area simulations is the Large-Open-Space model and a pathloss exponent of γ=2, 5 have been used. To determine whether a MT should be served by the AP directly or via a FRS, the path loss between AP and MT is assessed. If it is higher than a certain threshold, the MT is associated to the closest available FRS ("closest" in terms of pathloss). The traffic load is assumed to be constant bitrate, which is a reasonable assumption when investigating the maximum achievable end-to-end throughput. In the following, results for the Downlink (DL) direction are presented only, since the main effects that can be observed are quite similar in Uplink (UL) and DL directions, a result which is partly due to the Time Division Duplex (TDD) air interface studied.

Figure 7A:
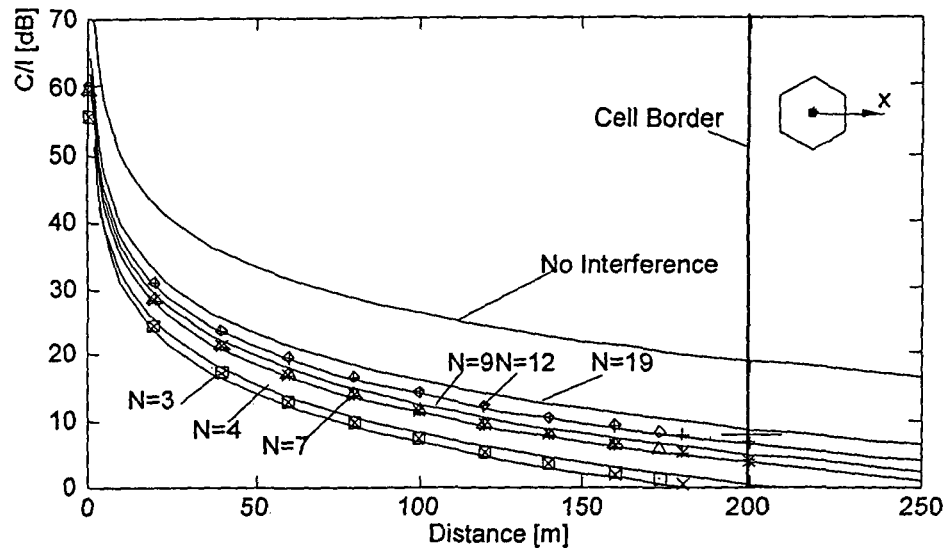
FIG. 7*a*: a diagram depicting the C/(I+N) vs. distance between MT and AP without relays in a wide-area propagation scenario according to the prior art (lines: analysis, markers: simulation)
Figure 7B:
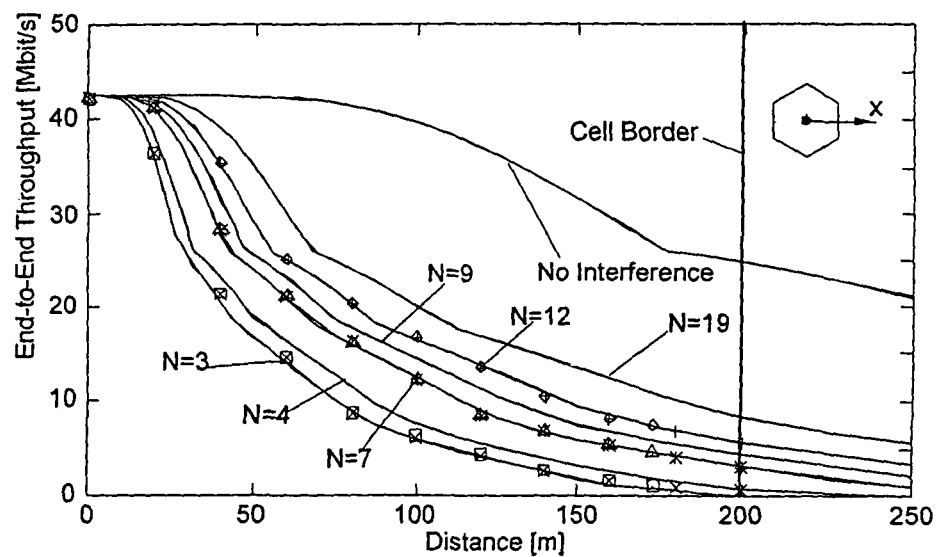
FIG. 7*b*: a diagram depicting the end-to-end throughput vs. distance between MT and AP without relays in a wide-area propagation scenario according to the prior art (lines: analysis, markers: simulation)

In FIGS. 7a and 7b, the DL C/(I+N) and the related maximum end-to-end throughput, respectively, are plotted over the distance of the MT from the AP when servicing the scenario by APs only, according to the wide-area scenario of the present invention.

In the wide-area cellular deployment, the C/(I+N) values degrade as expected with decreasing cluster size owing to increasing co-channel interference. For comparison, also the C/(I+N) for a single AP without Interference is shown. FIG. 7b also shows that at the cell border (at a distance of 200 m), a maximum end-to-end throughput of ca. 8 Mbit/s can be provided in the very optimistic case of N=19.

Simulations with fixed relays have also been performed in a wide-area deployment for the cluster sizes N=3, 7 and 12, cf. FIG. 5.

Figure 8A:
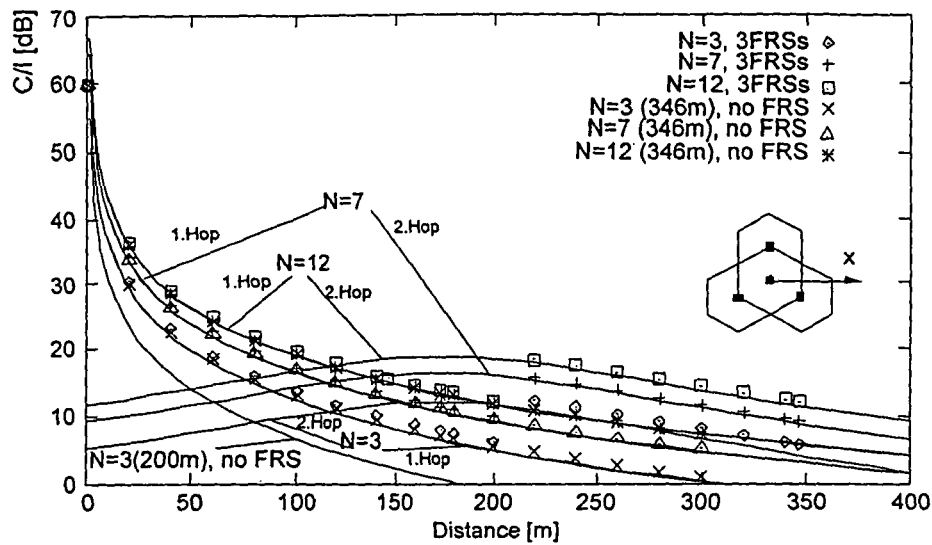
FIG. 8*a*: a diagram depicting the downlink (DL) C/(I+N) vs. distance in x-direction from (R)MT to AP and FRS, respectively, for varying cluster sizes (N=3, 7, 12) using relays (lines: analysis, markers: simulation)
Figure 8B:
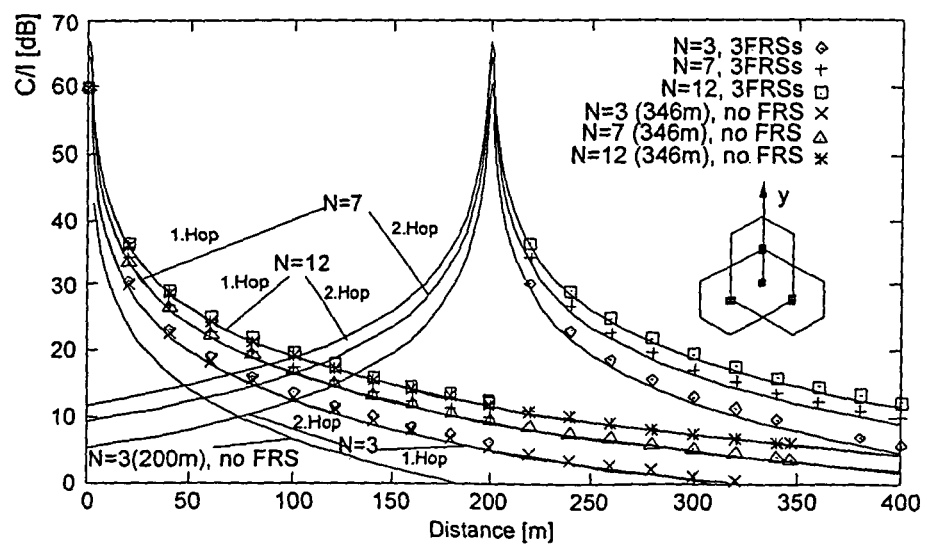
FIG. 8*b*: a diagram depicting the downlink (DL) end-to-end throughput vs. distance in y-direction from (R)MT to AP and FRS, respectively, for varying cluster sizes (N=3, 7, 12) using relays (lines: analysis, markers: simulation)

FIGS. 8a and 8b show the C/(I+N) over distance of the MT from the AP or FRS, respectively. The FRS is located at a distance of 200 m from the AP along the y-axis (see pictogram). This explains the characteristic peak of the curves in FIG. 8b denoted "2; Hop". It is further visible in both figures that the impact of the cluster-size N on the expected C/(I+N) values is considerable. For reference, the figures also show the C/(I+N) curve for the N=3 and R=200 m one-hop scenario. It shows that the relay deployment helps to considerably improve the C/(I+N) values over the distance from the AP.

Figure 9A:
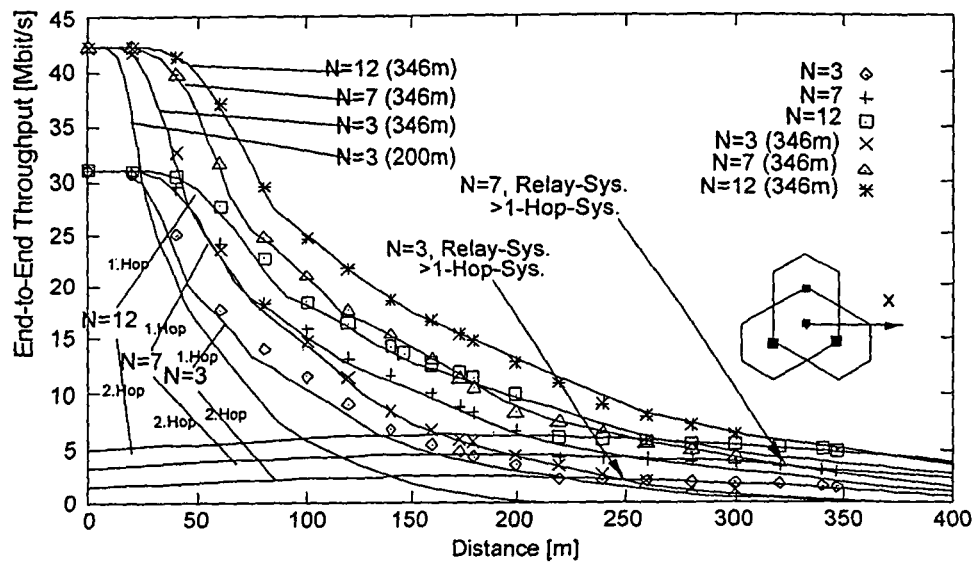
FIG. 9*a*: a diagram depicting the maximum DL end-to-end throughput vs. distance in x-direction from (R)MT to AP or FRS, respectively, for varying cluster sizes (N=3, 7, 12) and sub-cell radii of the base station (200 m, 346 m) using relays with sub-cell radius 200 m, but no receive antenna gain between AP and FRS.
Figure 9B:
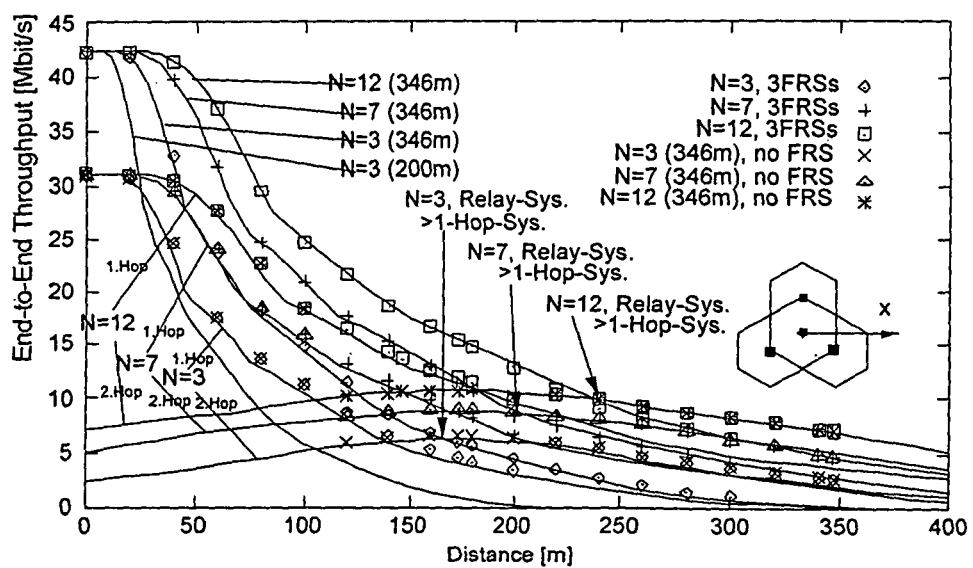
FIG. 9*b*: a diagram depicting the maximum DL end-to-end throughput vs. distance in y-direction from (R)MT to AP or FRS, respectively, for varying cluster sizes (N=3, 7, 12) and sub-cell radii of the base station (200 m, 346 m) using relays with sub-cell radius 200 m, but no receive antenna gain between AP and FRS.

FIGS. 9a and 9b show the maximum achievable downlink end-to-end throughput as a function of the distance (in x- and y-direction, respectively) of an MT from the AP (denoted as "1. Hop"), and the end-to-end throughput as a function of said distance encountered by MTs being served by an FRS (denoted as "2. Hop").

The FRS are located at a distance of 200 m from the AP, e.g. in the y-direction (shown in the pictogram). This explains the maximum of the throughput curve for the second hop visible at that distance. Each set of curves has the cluster size N as a parameter. As expected, the curves with N=3 show the lowest throughput values, owing to the highest encountered interference.

Figure 9C:
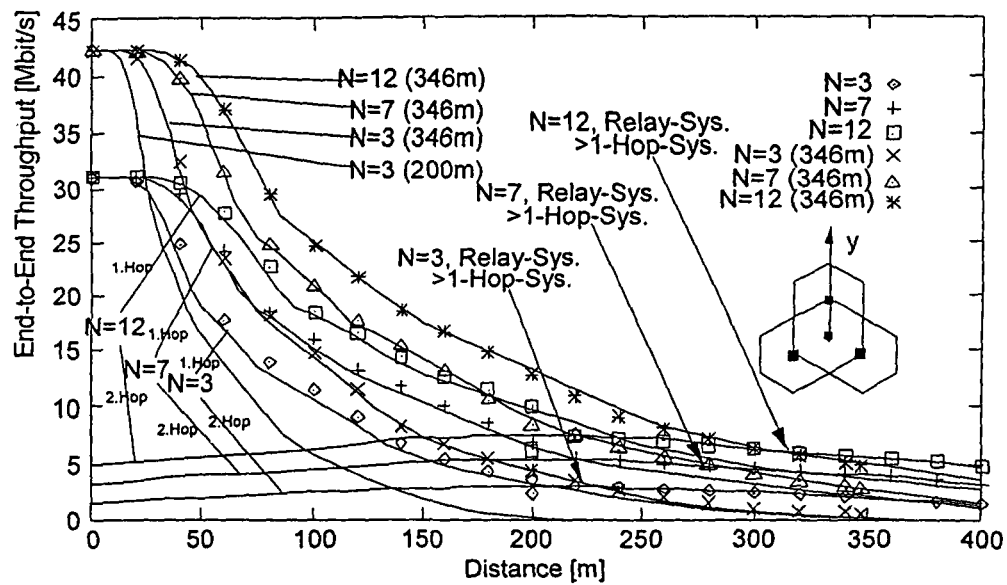
FIG. 9*c*: a diagram depicting the maximum DL end-to-end throughput vs. distance in x-direction from (R)MT to AP or FRS, respectively, for varying cluster sizes (N=3, 7, 12) and sub-cell radii of the base station (200 m, 346 m) using relays with sub-cell radius 200 m, with receive antenna gain of 11.8 dB between AP and FRS.
Figure 9D:
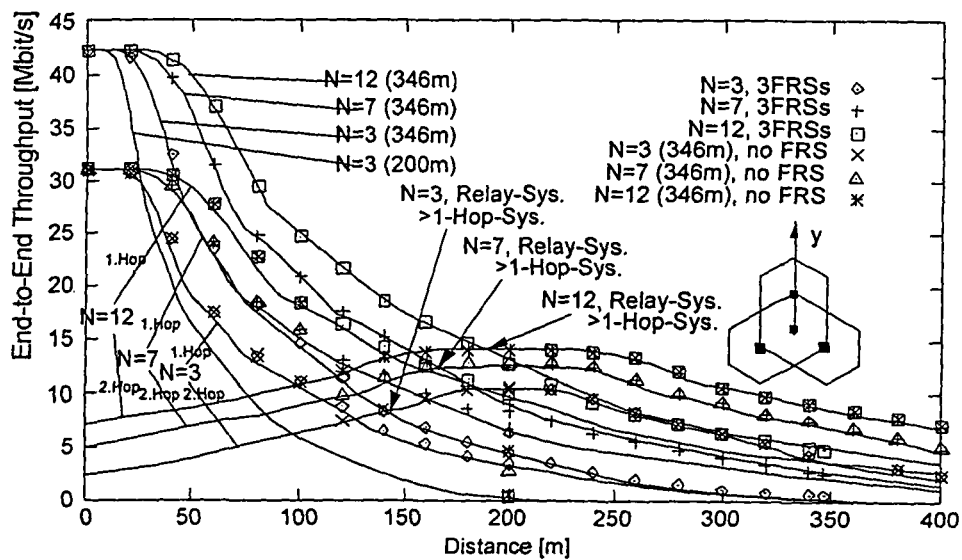
FIG. 9*d*: a diagram depicting the maximum DL end-to-end throughput vs. distance in y-direction from (R)MT to AP or FRS, respectively, for varying cluster sizes (N=3, 7, 12) and sub-cell radii of the base station (200 m, 346 m) using relays with sub-cell radius 200 m, with receive antenna gain of 11.8 dB between AP and FRS.

FIGS. 9c and 9d show the maximum achievable downlink end-to-end throughput when an antenna gain of 11.8 dB is assumed between AP and FRS. Again, FIG. 9c represents the situation along the x-axis, while FIG. 9d refers to the y-axis of the relay-enhanced cell (also refer to the small pictograms included).

Like on the first hop, the situation for the RMTs is almost similar to that of the MTs served directly by the AP in the single hop case (included for reference with a cell size of R=346 m). Depending on the cluster-size N, the maximum end-to-end throughput along the y-axis (FIG. 9c) improves for ranges greater than 220 m (N=3), 280 m (N=7) and 320 m (N=12) when relay stations are used instead of a single-hop deployment. Along the x-axis (FIG. 9a), improvements can be observed for N=3 and N=7 (for ranges>250 m and 325 m).

If an additional antenna gain is assumed between AP and FRS, the advantages of the FRS concept can already be observed at about 140 m (N=3), 170 m (N=7) and 190 m (N=12) along the y-axis (FIG. 9d), while—along the x-axis (FIG. 9b)—the throughput of the two hop system outperforms the one-hop system starting at 170 m (N=3), 200 m (N=7) and 240 m (N=12). In general, a considerable improvement compared to the deployment without gain antennas can be observed.

Figure 10:
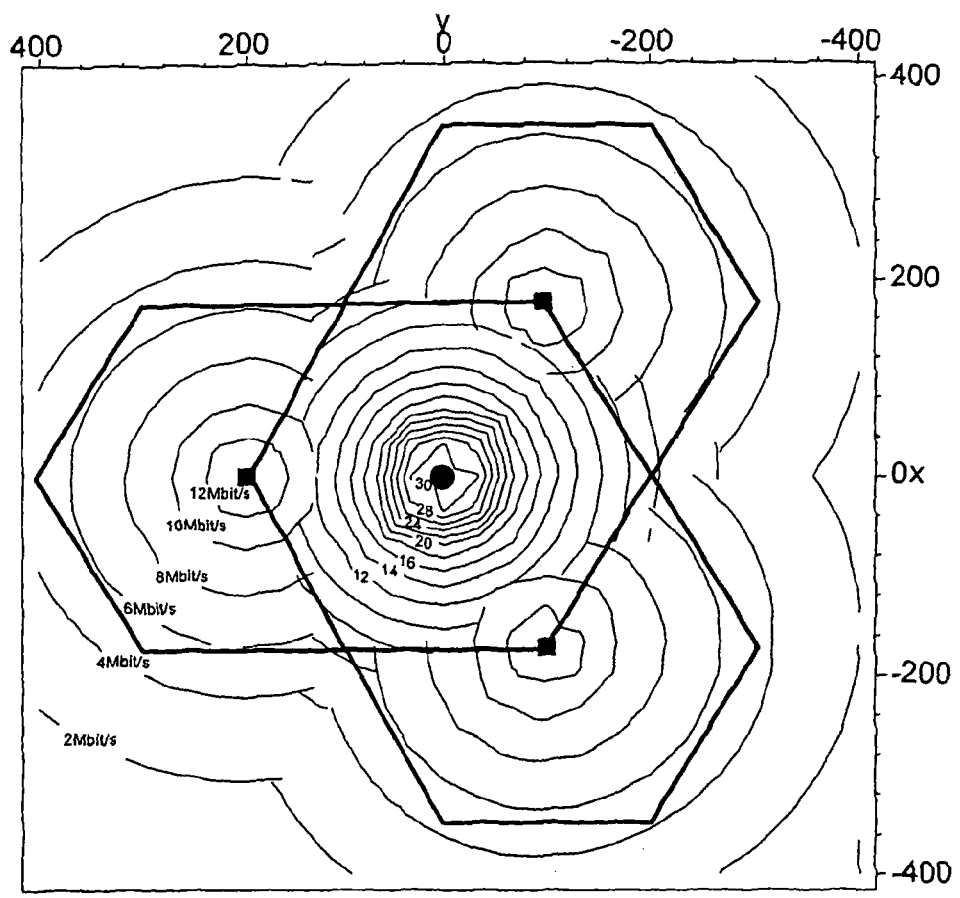
FIG. 10: a diagram depicting the achieved DL end-to-end throughput (given in discrete PHY mode bit-rates) in the relay-enhanced cell according to FIG. 4 with receive antenna gain of 11.8 dB between AP and FRS.

In addition, a more homogeneous (or more equalized) distribution of the maximum achievable throughput can be noticed, which is especially beneficial in areas close to the cell border, cf. FIG. 10. The tighter the frequency reuse, i.e. the smaller the cluster size N, the smaller becomes the minimal range where the use of FRSs is beneficial. Also, the number of necessary frequency bands is reduced with lower cluster sizes N. This allows to use more frequency bandwidth per cell and thus to increase an operators network capacity. When using FRSs, even in a cluster with N=3 the cell border can be served at sufficient quality due to the range extension. The gain obtained from the relaying scheme justifies transmitting the information twice.

The results given above are for the comparison of one- and two-hop cells with the same cell area (equal AP density). If an N=3-cluster with 200 m-cells is compared with an N=3 relay-enhanced cell with 200 m sub-cells (equal site density), the advantages of the relay-based concept already become visible at distances>30 m from the AP.

In addition to the end-to-end throughput studied above, the system capacity, i.e. the aggregate traffic that can be carried in a well-defined service area and a certain amount of used spectrum is an important measure to assess a system's performance. To optimize a system, it is very important to have a clearly defined optimization goal.

TABLE 1

Average cell capacity and spectral efficiency for a cell with 10 MTs and Exhaustive Round Robin (ERR) Scheduling, comparing the prior art widearea cellular single-hop deployment ("Standard") with the multi-hop deployment (with 3 FRSs and both with and without antenna gain of 11.8 dB between AP and FRSs)

| Scenario | Cluster Size N | Cell Size $[m^2]/10^3$ | Cell Capacity [Mbit/s] | Spectral Efficiency $[bit/s/Hz/m^2]$ |
| --- | --- | --- | --- | --- |
| Standard 200 m | 3 | 104 | 6.84 | 1.10 |
| Standard 200 m | 7 | 104 | 12.20 | 0.84 |
| Standard 200 m | 12 | 104 | 16.42 | 0.66 |
| 3FRS | 3 | 311 | 4.21 | 0.23 |
| 3FRS | 7 | 311 | 7.27 | 0.17 |
| 3FRS | 12 | 311 | 9.46 | 0.13 |
| Standard 346 m | 3 | 311 | 6.53 | 0.35 |
| Standard 346 m | 7 | 311 | 11.42 | 0.26 |
| Standard 346 m | 12 | 311 | 14.82 | 0.20 |
| 3FRS + 11.8 dB | 3 | 311 | 7.44 | 0.40 |
| 3FRS + 11.8 dB | 7 | 311 | 11.14 | 0.26 |
| 3FRS + 11.8 dB | 12 | 311 | 13.41 | 0.18 |

Table 1 shows the average end-to-end cell throughput for the different 1- and 2-hop deployments in the wide-area scenario. It should be noted that the above-presented results were obtained from a system with completely orthogonal channels in the time domain; potential re-use of transmission channels, for instance in the time domain, has not yet been exploited, so that even further increased spectral efficiencies may be expected for the relay-based concept. Again, from the small cell size and the high cell throughput results a relatively high area spectral efficiency in the case of the 200 m-cells. However, the interesting observation is that the relay-based system substantially achieves the same area spectral efficiency as a prior art one-hop system with the same overall cell size (cf. rows 7-9 with rows 10-12 of Table 1). At the same time, as is visible from FIGS. 9a-9d, and FIG. 10, the coverage quality at the cell border is superior in the two-hop case. Under dense frequency re-use (N=3), the two-hop system according to the present invention even exhibits a 14% higher spectral efficiency than the prior art one-hop system (compare rows 7 and 10 of Table 1).

The following embodiments shall also be understood to be disclosed by the present patent application:

Embodiment 1

A cellular wide-area radio communications system, comprising a plurality of base stations, a plurality of relay stations, and a plurality of mobile stations, wherein each of said relay stations is associated with at least one of said base stations, wherein each of said mobile stations is associated at least with one of said base stations or one of said relay stations, wherein wireless data transmissions between mobile stations and base stations take place either as single-hop data transmissions between said mobile stations and their associated base stations, or as multi-hop data transmissions that comprise a data transmission between said mobile stations and their associated relay stations and a data transmission between said relay stations and base stations associated with said relay stations, and wherein an average number of multi-hop data transmissions in said radio communications system is equal to or larger than an average number of single-hop data transmissions.

Embodiment 2

The system according to embodiment 1, wherein in said data transmissions between said relay stations and their associated base stations, directional receive antennas are used by said relay stations and/or said base stations.

Embodiment 3

The system according to any of the embodiments 1-2, wherein each of said base stations is associated with at least two relay stations, and wherein each of said base stations with its at least two associated relay stations provides radio coverage for mobile stations in one respective relay-enhanced cell of said cellular radio communications system.

Embodiment 4

The system according to embodiment 3, wherein in each relay-enhanced cell, said relay stations and said base station they are associated with are substantially symmetrically positioned.

Embodiment 5

The system according to any of the embodiments 3-4, wherein said relay-enhanced cells are positioned across the coverage area of said cellular radio communications system according to a substantially regular arrangement.

Embodiment 6

The system according to any of the embodiments 3-5, wherein in each relay-enhanced cell, a position of said relay stations and said base station they are associated with is determined so that an equalization of a carrier-to-interference power ratio per small area element of the cellular radio communications system is achieved, wherein said small area element is some orders of magnitude smaller than the total area covered by said relay-enhanced cell.

Embodiment 7

The system according to any of the embodiments 3-5, wherein in each relay-enhanced cell, a position of said relay stations and said base station they are associated with is determined so that an equalization of an available end-to-end transmission capacity per small area element of the cellular radio communications system is achieved, wherein said small area element is some orders of magnitude smaller than the total area covered by said relay-enhanced cell.

Embodiment 8

The system according to any of the embodiments 3-7, wherein each base station in a relay-enhanced cell is associated with K>2 relay stations, and wherein said K relay stations are substantially positioned on a circle around said base station they are associated with mutual angular distances of substantially 360°/K.

Embodiment 9

The system according to any of the embodiments 3-8, wherein each base station and each relay station use respective transmission channels for their data transmissions, wherein said transmission channels are defined by a carrier frequency and/or time slot and/or spreading code and/or polarization state and/or spatial, direction and/or group of frequency sub-carriers and/or frequency band and/or scrambling code.

Embodiment 10

The system according to embodiment 9, wherein in each relay-enhanced cell, said base station and its associated relay stations share transmission channels from one set of transmission channels.

Embodiment 11

The system according to embodiment 10, wherein all transmission channels of one set of transmission channels use the same frequency band.

Embodiment 12

The system according to any of the embodiments 10-11, wherein N sets of transmission channels are available for said relay-enhanced cells, and wherein for N>1, said N sets of transmission channels are substantially orthogonal.

Embodiment 13

The system according to embodiment 12, wherein sets of transmission channels are assigned to said relay-enhanced cells so that a distance between relay-enhanced cells using the same set of transmission channels is optimised according to a pre-defined optimisation criterion.

Embodiment 14

The system according to embodiment 12, wherein N>1 holds, and wherein said N sets of transmission channels are assigned to said relay-enhanced cells so that relay-enhanced cells that use the same set of transmission channels are positioned across the coverage area of said cellular radio communications system in a substantially regular arrangement.

Embodiment 15

The system according to embodiment 9, wherein each of said base stations and each of said relay stations is assigned a respective set of transmission channels for their respective data transmissions.

Embodiment 16

The system according to embodiment 15, wherein all transmission channels of one set of transmission channels use the same frequency band.

Embodiment 17

The system according to any of the embodiments 15-16, wherein N different sets of transmission channels can be assigned to said relay stations, and wherein for N>1, said N sets of transmission channels are substantially orthogonal.

Embodiment 18

The system according to any of the embodiments 15-17, wherein M different sets of transmission channels can be assigned to said base stations, and wherein for M>1, said M sets of transmission channels are substantially orthogonal.

Embodiment 19

The system according to any of the embodiments 15-18, wherein sets of transmission channels used by a base station and its associated relay stations in a relay-enhanced cell are substantially orthogonal.

Embodiment 20

The system according to embodiment 19, wherein sets of transmission channels used by at least two relay stations of a relay enhanced cell are substantially orthogonal.

Embodiment 21

The system according to embodiment 19, wherein at least two relay stations of a relay-enhanced cell use the same set of transmission channels.

Embodiment 22

The system according to any of the embodiments 15-21, wherein sets of transmission channels are assigned to said base stations and relay stations so that a distance between relay stations using the same set of transmission channels, between base stations using the same set of transmission channels and between base stations and relay stations using the same set of transmission channels is optimised according to a pre-defined optimisation criterion.

Embodiment 23

The system according to any of the embodiments 15-16, wherein N different sets of transmission channels can be assigned to said relay and base stations, wherein for N>1, said N sets of transmission channels are substantially orthogonal.

Embodiment 24

The system according to embodiment 23, wherein said N sets of transmission channels are assigned to said relay and base stations of said cellular radio communications system to that relay stations that use the same set of transmission channels and base stations that use the same set of transmission channels are positioned across the coverage area of said cellular radio communications system in a substantially regular arrangement, respectively.

Embodiment 25

The system according to any of the embodiments 10-24, wherein data transmissions between a base station and its associated mobile stations and data transmissions between said base station and its' associated relay-stations share transmission channels from one set of transmission channels.

Embodiment 26

The system according to any of the embodiments 1-25, wherein data transmissions of neighbouring relay stations of different relay-enhanced cells are decoupled in the time domain and/or frequency domain and/or code domain and/or polarization domain and/or space domain.

Embodiment 27

The system according to any of the embodiments 1-26, wherein it is ensured that transmission channels for data transmissions between base stations and their associated relay stations in a relay-enhanced cell are substantially orthogonal to transmission channels of data transmissions between base stations and their associated relay stations in neighbouring relay-enhanced cells.

Embodiment 28

The system according to any of the embodiments 1-27, wherein said data transmissions are based on multi-carrier modulation.

Embodiment 29

The system according to any of the embodiments 1-28, wherein said relay stations are layer-2 relays.

Embodiment 30

The system according to any of the embodiments 1-28, wherein said relay stations are layer-3 relays.

Embodiment 31

The system according to any of the embodiments 1-30, wherein said base stations and/or said relay stations use multi-element or sector antennas at least for said data transmissions with their associated mobile stations.

Embodiment 32

The system according to any of the embodiments 1-31, wherein said base stations and said relay stations use multi-element antennas, and wherein the capacity of said data transmissions between said base stations and their associated relay stations is increased by applying Multiple-Input Multiple-Output techniques.

Embodiment 33

The system according to any of the embodiments 3-32, wherein in each relay-enhanced cell, a broadcast channel is transmitted by said base station and its associated relay stations.

Embodiment 34

A base station in a system according to the embodiments 1-33.

Embodiment 35

A relay station in a system according to the embodiments 1-33.

Embodiment 36

A mobile station in a system according to the embodiments 1-33.

The invention has been described above by means of a preferred embodiment. It should be noted that there are alternative ways and variations, which are obvious to a skilled person in the art and can be implemented without deviating from the scope and spirit of the appended claims. In particular, the present invention is by no means limited to application in the HIPERLAN2 system. It may equally well be deployed in all other types of cellular radio communications systems, as for instance the GSM or UMTS system. Furthermore, instead of sharing the transmission channels, for instance the UL and DL time slots of a MAC frame, among the base station and associated relay stations in each relay-enhanced cell, also different sets of transmission channels, which may for instance differ in the frequency band used, may be assigned to the base station and each relay station in a relay-enhanced cell to allow for concurrent data transmissions between the base station and its associated mobile stations and the relay stations and their associated mobile stations.

What is claimed is:

1. A cellular wide-area radio communications system, comprising:
    a plurality of base stations;
    a plurality of fixed relay stations; and
    a plurality of mobile stations;
    each of said relay stations associated with at least one of said base stations, each of said mobile stations associated at least with one of said base stations or one of said relay stations, wireless data transmissions between mobile stations and base stations taking place either as single-hop data transmissions between said mobile stations and their associated base stations, or as multi-hop data transmissions that comprise a data transmission between said mobile stations and their associated relay stations and a data transmission between said relay stations and base stations associated with said relay stations, said data transmission between said relay stations and base stations associated with said relay stations of said multi-hop data transmissions experiencing an additional antenna gain as compared to said single-hop data-transmissions, and an average number of multi-hop data transmissions in said radio communications system being equal to or larger than an average number of single-hop data transmissions so that, on average, at least as many multi-hop data-transmissions as single-hop data transmissions take place.

2. The system according to claim 1, wherein in said data transmissions between said relay stations and their associated base stations, directional receive antennas are used by said relay stations and/or said base stations introducing said additional antenna gain.

3. The system according to claim 1, wherein each of said base stations is associated with at least two relay stations, and wherein each of said base stations with its at least two associated relay stations provides radio coverage for mobile stations in one respective relay-enhanced cell of said cellular radio communications system.

4. The system according to claim 1, wherein each base station and each relay station use respective transmission channels for their data transmissions, wherein said transmission channels are defined by a carrier frequency and/or time slot and/or spreading code and/or polarization state and/or spatial direction and/or group of frequency sub-carriers and/or frequency band and/or scrambling code.

5. The system according to claim 4, wherein in each relay-enhanced cell, said base station and its associated relay stations share transmission channels from one set of transmission channels.

6. The system according to claim 5, wherein data transmissions between a base station and its associated mobile stations and data transmissions between said base station and its associated relay stations share transmission channels from one set of transmission channels.

7. The system according to claim 1, wherein said relay stations are layer-2 relays.

8. The system according to claim 1, wherein said relay stations are layer-3 relays.

9. The system according to claim 1, wherein said base stations and/or said relay stations use multi-element or sector antennas at least for said data transmissions with their associated mobile stations.

10. The system according to claim 1, wherein said base stations and said relay stations use multi-element antennas, and wherein the capacity of said data transmissions between said base stations and their associated relay stations is increased by applying Multiple-Input Multiple-Output techniques.

11. The system according to claim 1, wherein in each relay-enhanced cell, a broadcast channel is transmitted by said base station and its associated relay stations.

12. The system according to claim 1, wherein said average number of single-hop data transmissions is larger than zero.

13. A base station in a system according to claim 1.

14. A relay station in a system according to claim 1.

15. A mobile station in a system according to claim 1.

16. A method for operating a cellular wide-area radio communications system that comprises a plurality of base stations, a plurality of fixed relay stations and a plurality of mobile stations, with each of said relay stations being associated with at least one of said base stations, and each of said mobile stations associated at least with one of said base stations or one of said relay stations, said method comprising:

enabling wireless data transmissions between mobile stations and base stations either as single-hop data transmissions between said mobile stations and their associated base stations, or as multi-hop data transmissions that comprise a data transmission between said mobile stations and their associated relay stations and a data transmission between said relay stations and base stations associated with said relay stations, wherein said data transmission between said relay stations and base stations associated with said relay stations of said multi-hop data transmissions experience an additional antenna gain as compared to said single-hop data-transmissions, positioning the fixed relay stations in a way that an average number of multi-hop data transmissions in said radio communications system are equal to or larger than an average number of single-hop data transmissions so that, on average, at least as many multi-hop data-transmissions as single-hop data transmissions take place.

17. The method according to claim 16, wherein in said data transmissions between said relay stations and their associated base stations, directional receive antennas are used by said relay stations and/or said base stations introducing said additional antenna gain.

18. The method according to claim 16, wherein each of said base stations is associated with at least two relay stations, and wherein each of said base stations with its at least two associated relay stations provides radio coverage for mobile stations in one respective relay-enhanced cell of said cellular radio communications system.

19. The method according to claim 18 wherein in each relay-enhanced cell, said base station and its associated relay stations share transmission channels from one set of transmission channels.

20. The method according to claim 19, wherein data transmissions between a base station and its associated mobile stations and data transmissions between said base station and its associated relay stations share transmission channels from one set of transmission channels.

21. The method according to claim 16, wherein said average number of single-hop data transmissions is larger than zero.

* * * * *